United States Patent
Parmar et al.

(10) Patent No.: US 12,015,539 B2
(45) Date of Patent: Jun. 18, 2024

(54) MITIGATING OVERSUBSCRIPTION OF TRAFFIC TO EDGE NODES IN A DATA CENTER

(71) Applicant: VMware, Inc., Palo Alto, CA (US)

(72) Inventors: Ankit Parmar, Santa Clara, CA (US); Harish Kumar Gaviyappa, San Jose, CA (US); Pawan Shukla, Cupertino, CA (US); Ravi Parikh, San Jose, CA (US); Ritesh Tiwari, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/726,453

(22) Filed: Apr. 21, 2022

(65) Prior Publication Data

US 2023/0344744 A1    Oct. 26, 2023

(51) Int. Cl.
| | |
|---|---|
| *H04L 45/02* | (2022.01) |
| *H04L 45/00* | (2022.01) |
| *H04L 45/12* | (2022.01) |
| *H04L 45/42* | (2022.01) |
| *H04L 47/122* | (2022.01) |

(52) U.S. Cl.
CPC ............ *H04L 45/02* (2013.01); *H04L 45/123* (2013.01); *H04L 45/38* (2013.01); *H04L 45/42* (2013.01); *H04L 47/122* (2013.01)

(58) Field of Classification Search
CPC ....... H04L 45/02; H04L 45/123; H04L 45/38; H04L 45/42; H04L 47/122
See application file for complete search history.

(56) References Cited

U.S. PATENT DOCUMENTS

| | | | |
|---|---|---|---|
| 9,124,515 B2 | 9/2015 | Curtis et al. | |
| 10,097,465 B2 | 10/2018 | Sreeramoju et al. | |
| 10,193,771 B2 | 1/2019 | Koponen et al. | |
| 10,833,992 B1 * | 11/2020 | Dickinson | H04L 45/586 |
| 11,038,953 B1 * | 6/2021 | Nayak | H04L 45/28 |
| 11,095,557 B2 | 8/2021 | Devireddy et al. | |

(Continued)

FOREIGN PATENT DOCUMENTS

CN          103716208 A       4/2014

OTHER PUBLICATIONS

"Du et al. OpenFlow-Based Dynamic Server Cluster Load Balancing, Aug. 8, 2015, IEEE" with Measurement Support (Year: 2015).*

(Continued)

*Primary Examiner* — Moustafa M Meky
*Assistant Examiner* — Kidest Mendaye
(74) *Attorney, Agent, or Firm* — Kim & Stewart LLP (57) ABSTRACT

An example method of mitigating oversubscription of traffic to edge services gateways in a data center includes: receiving, by a host of the data center, traffic metrics corresponding to the ESGs; determining traffic congestion at a first active edge of the ESGs in response to the traffic metrics; dividing, in response to the traffic congestion, a classless inter-domain routing (CIDR) block assigned to the first active edge into a first CIDR block and a second CIDR block; and creating, in a routing table of a router, a first route between an internet protocol (IP) address of the first active edge and the first CIDR block, and a second route between an IP address of a second active edge of the ESGs and the second CIDR block.

20 Claims, 6 Drawing Sheets

(56) References Cited

U.S. PATENT DOCUMENTS

| | | | |
|---|---|---|---|
| 2002/0163884 A1* | 11/2002 | Peles | H04L 47/125 |
| | | | 370/395.21 |
| 2020/0167361 A1* | 5/2020 | Princehouse | G06F 3/0649 |
| 2021/0092057 A1* | 3/2021 | Devireddy | H04L 45/54 |
| 2021/0377134 A1 | 12/2021 | Koponen et al. | |
| 2022/0150105 A1* | 5/2022 | Thubert | H04L 45/28 |
| 2022/0182318 A1* | 6/2022 | Shilimkar | H04L 43/0817 |
| 2022/0231943 A1* | 7/2022 | Brar | H04L 45/74 |
| 2022/0263754 A1* | 8/2022 | Tracy | H04L 45/02 |

OTHER PUBLICATIONS

Unpublished U.S. Appl. No. 17/852,917, filed Jun. 29, 2022, 30 pages.

* cited by examiner

MITIGATING OVERSUBSCRIPTION OF TRAFFIC TO EDGE NODES IN A DATA CENTER

Applications today are deployed onto a combination of virtual machines (VMs), containers, application services, and more within a software-defined datacenter (SDDC). The SDDC includes a server virtualization layer having clusters of physical servers that are virtualized and managed by virtualization management servers. Each host includes a virtualization layer (e.g., a hypervisor) that provides a software abstraction of a physical server (e.g., central processing unit (CPU), random access memory (RAM), storage, network interface card (NIC), etc.) to the VMs. Hosts can be organized into clusters ("host clusters") and managed by a virtualization management server. The virtualization management server treats host clusters as pools of compute capacity for use by virtual machines and namespace containers.

The hypervisors in the SDDC can support both management VMs (e.g., virtualization management server, network managers, etc.) and workload VMs for running workload applications. The SDDC may implement one or more software defined networks (SDNs) which are logical overlay networks having address spaces that are decoupled from the underlying physical network infrastructure. The overlay networks are implemented by managed forwarding devices on hosts, as well as physical routers and other components. Separation between the overlay and underlay networks may be realized by encapsulating overlay network packets for transport across the underlay network. The overlay network is a "logical network" in the sense that it, including logical switches and logical routers, exists only in software and in the forwarding tables of the physical managed forwarding devices.

The software defined network may also be supported by edge service gateways (ESGs) that facilitate communication between overlay networks on which workload VMs reside and physical networks, including wide area networks (WANs), such as the public Internet. The ESGs may provide various gateway services to the software defined logical overlay networks, such as network address translation (NAT), firewall (FW), virtual private network (VPN), domain name service (DNS), and the like services. ESGs can function in active/standby pairs for high-availability, where one ESG of the pair is the active ESG ("active edge") and the other ESG is a standby ESG ("standby edge"). If a heartbeat failure occurs on the active edge, the standby edge takes over and becomes the active edge. ESGs can be horizontally scaled by providing multiple active/standby pairs.

An SDDC can be hosted by a public cloud, which are services that provide datacenter services to a plurality of tenants for a fee that typically relates to metered usage of the services, Hosts residing in a public cloud may execute hypervisors that support management VMs virtualization management servers, network managers, etc.), workload VMs, and edge VMs (e.g., VMs that implement the ESGs). Most public cloud vendors offer only layer 3 (L3) connectivity to VMs running in the public cloud. The media access control (MAC) addresses of the physical network interfaces are managed by the vendors and are typically not exposed to subscribers. The traffic rate in and out of the SDDC is limited by the capacity provided by the active edge VMs and their underlying hosts. More active/standby edge pairs can support higher bandwidth under the condition that an underlying host has only a single active edge. Such horizontal scaling, however, can result in certain active edge(s) and the corresponding hosts being oversubscribed (e.g., high packets-per-second (PPS) causing traffic congestion) while other active edge(s) have little or no traffic. It is therefore desirable to provide a mechanism for balancing the traffic across active edges in the SDDC.

SUMMARY

In an embodiment, a method of mitigating oversubscription of traffic to edge services gateways (ESGs) in a data center includes: receiving, by a host of the data center, traffic metrics corresponding to the ESGs; determining traffic congestion at a first active edge of the ESGs in response to the traffic metrics; dividing, in response to the traffic congestion, a classless inter-domain routing (CIDR) block assigned to the first active edge into a first CIDR block and a second CIDR block; and creating, in a routing table of a router, a first route between an internet protocol (IP) address of the first active edge and the first CIDR block, and a second route between an IP address of a second active edge of the ESGs and the second CIDR block.

Further embodiments include a non-transitory computer-readable storage medium comprising instructions that cause a computer system to carry out the above method, as well as a computer system configured to carry out the above method.

DETAILED DESCRIPTION

Figure 1:
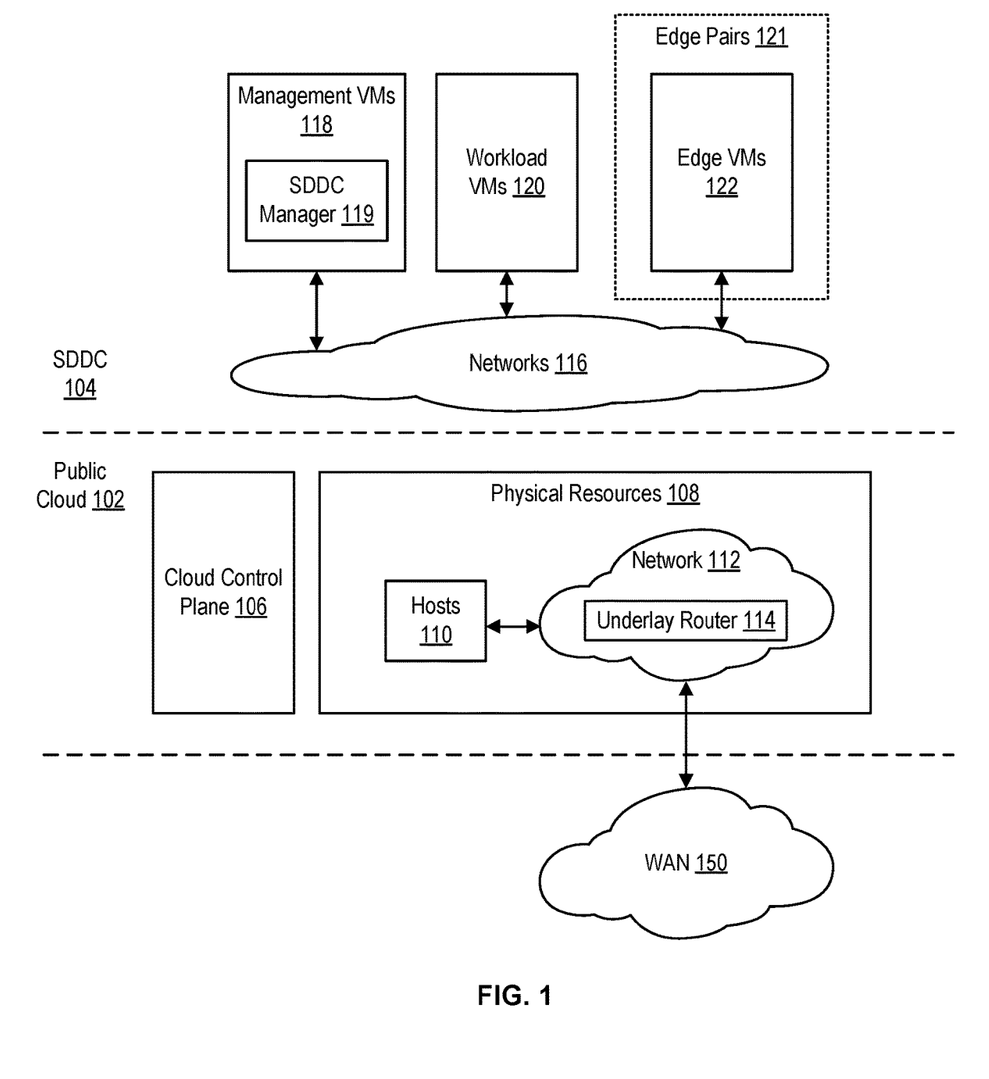
FIG. 1 is a block diagram depicting a software-defined data center (SDDC) implemented in a public cloud according to embodiments.

FIG. 1 is a block diagram depicting a software-defined data center (SDDC) implemented in a public cloud according to embodiments. In embodiments, public cloud 102 includes physical resources 108 managed by a cloud control plane 106. Physical resources 108 include hosts 110 connected by a physical network ("network 112"). Hosts 110 comprise server-grate hardware platforms, such as x86 architecture platforms. Cloud control plane 106 comprises software executing on a host 110 (or some other host) configured to manage and control physical resources 108, such as hosts 110 and network 112. In embodiments, network 112 is a layer 3 (L3) network that includes an underlay router 114. Cloud control plane 106 can configure underlay router 114 with route tables. Network 112 can connect to a wide area network (WAN) 150, such as the public Internet. Hosts 110 execute virtualization software (e.g., hypervisors) that virtualizes their hardware platforms and support execution of virtual computing instances, such as virtual machines (VMs).

SDDC 104 includes management VMs 118, workload VMs 120, and edge VMs 122. Management VMs 118 execute management control planes, such as a virtualization management server, a network manager, or the like. Workload VMs 120 are managed by management VMs 118 and execute various applications. VMs 118, 120, and 122 execute in hosts 110 and are managed by the virtualization software thereof. VMs 118, 120, and 122 are connected to networks 116. Networks 116 include a physical network (e.g., network 112) and a logical network (e.g., a software-defined network overlaid on the physical network). A logical network (also referred to as an overlay network) uses a layer 2 over layer 3 (L2-over-L3) tunneling protocol to virtualize a physical network (e.g., network 112) and provided a stretched L2 network for use by workload VMs 120. Management VMS 118 are connected to a physical network (e.g., network 112) for management of workload VMs 120 and/or edge VMs 122. Management VMs 118 do not use L2-over-L3 tunneling. Edge VMs 122 provide connectivity between logical networks and between logical networks and physical networks such as WAN 150.

Edge VMs 122 execute edge service gateways (ESGs) that provide various network services on behalf of workload VMs 120. Edge VMs 122 can be formed into active-standby pairs for high-availability ("edge pairs 121). In general, SDDC 104 includes at least one edge pair 121. Traffic sourced by a workload VM 120 destined for WAN 150 ("outbound traffic") passes through a router configured on edge VM 122 (e.g., an active edge of an edge pair 121). Traffic sourced from WAN 150 and destined for a workload VM 120 ("inbound traffic") passes through an edge VM 122 (e.g., an active edge of an edge pair 121).

To accommodate increased bandwidth requirements, SDDC 104 supports horizontal scaling of edge services by increasing the number of edge pairs 121 and hence the number of active edges servicing inbound and outbound traffic. For example, each active edge in edge pairs 121 can be assigned to handle a classless inter-domain routing (CIDR) block of internee protocol (IP) addresses assigned to workload VMs 120. SDDC 104 distributes the traffic load across the active edges in edge pairs 121 by assigning different CIDR blocks among the active edges. In some cases, however, an active edge in edge pairs 121 can become oversubscribed, e.g., be assigned a CIDR block associated with a large amount of traffic resulting in congestion, which can increase latencies and even cause packets to be dropped. The traffic rate (e.g., in terms of packets per second) is limited by the capacity provided by the underlying host of the active edge and its connection to the physical network. If the traffic in the CIDR block assigned to an active edge corresponds to a traffic throughput that exceeds the capacity provided by the host (or a threshold amount relative to the capacity) a traffic congestion condition exists. Techniques are described below for mitigating such traffic congestion at ESGs in SDDC 104.

Figure 2:
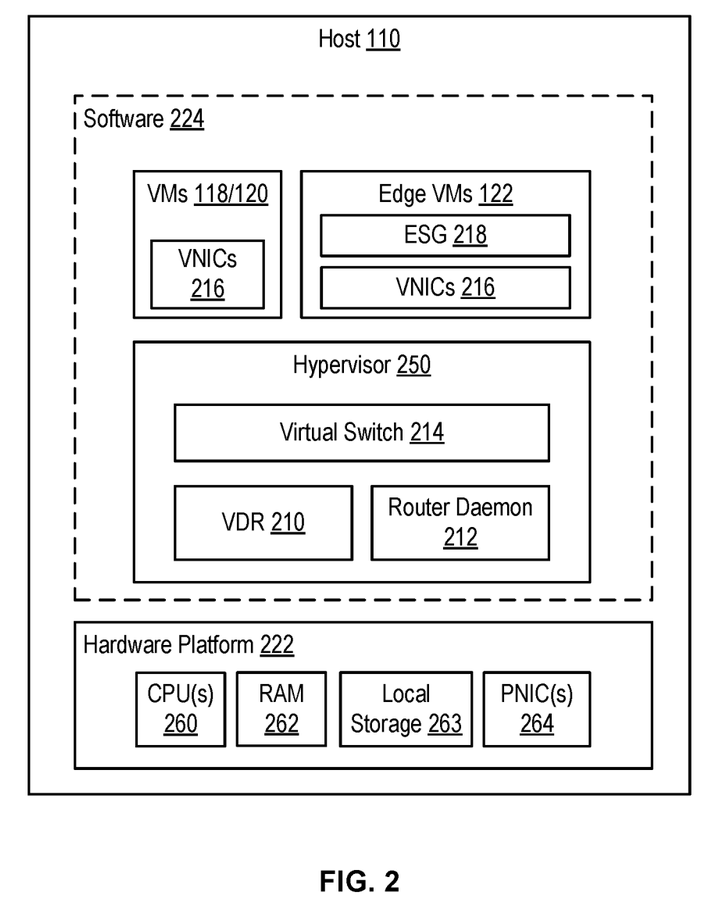
FIG. 2 is a block diagram depicting a host according to embodiments.

FIG. 2 is a block diagram depicting a host 110 according to embodiments. Host 110 includes software 224 executing on a hardware platform 222. Hardware platform 222 includes conventional components of a computing device, such as one or more central processing units (CPUs) 260, system memory (e.g., random access memory (RAM) 262), one or more physical network interface controllers (PNICs) 264, and optionally local storage 263. CPUs 260 are configured to execute instructions, for example, executable instructions that perform one or more operations described herein, which may be stored in RAM 262. PNICs 264 enable host 110 to communicate with other devices through network 112.

Host 110 can access a shared storage (not shown) by using PNICs 164 to connect to network 112. In another embodiment (not shown) host 110 contains a host bus adapter (HBA) through which input/output operations (IOs) are sent to a shared storage over a separate network (e.g., a fibre channel (FC network). The shared storage can include one or more storage arrays, such as a storage area network (SAN), network attached storage (NAS), or the like. In some embodiments, host 110 includes local storage 263 (e.g., hard disk drives, solid-state drives, etc.). Local storage 263 in each host 110 can be aggregated and provisioned as part of a virtual SAN (vSAN), which is another form of shared storage.

Software 224 includes a virtualization layer, referred to herein as a hypervisor 250, which directly executes on hardware platform 222. In an embodiment, there is no intervening software, such as a host operating system (OS), between hypervisor 250 and hardware platform 222. Thus, hypervisor 250 is a Type-1 hypervisor (also known as a "bare-metal" hypervisor). Hypervisor 250 abstracts processor, memory, storage, and network resources of hardware platform 222 to provide a virtual machine execution space within which multiple virtual machines (VM) may be concurrently instantiated and executed, including management VMs 118, compute VMs 120, and edge VMs 122. Edge VMs 122 execute ESGs 218 that provide various gateway services, as described above.

Hypervisor 250 includes a virtual switch 214, which is a software implementation of a managed network switch. Virtual network interface cards (VNICs) 216 in VMs 118/120 and edge VMs 122 connect to ports (not shown) of virtual switch 214. A logical network 116 of SDDC 104 can include one or more segments, each of which is an L2 network that can span across one or more hosts 110. The L2 segments can be connected to a logical router implemented by virtual distributed router (VDR) 210 in each host 110, which provides L3 connectivity for a logical network 116. Hypervisor 250 includes a router daemon 212 for configuring VDR 210.

Most public cloud vendors offer L3-only connectivity, where the media access control (MAC) addresses of PNICs 264 are managed by the cloud provider. While workload VMs 120 can overcome this limitation using an overlay network, VDR 210 must still handle management VM and edge VM communication. For management VMs 118 and edge VMs 122, VDR 210 is configured to translate source MAC addresses of packets to the MAC addresses of PNICs 264 for outbound traffic. VDR 210 is configured to translate destination MAC addresses of packets to the MAC addresses of VNICs 216 for inbound traffic. Router daemon 212 is configured to discover the VMs on hosts 110 and populate MAC address tables in VDR 210. Router daemon 212 is also configured to program cloud control plane 106 to configure the cloud provider routing infrastructure (e.g., underlay router 114).

Figure 3:
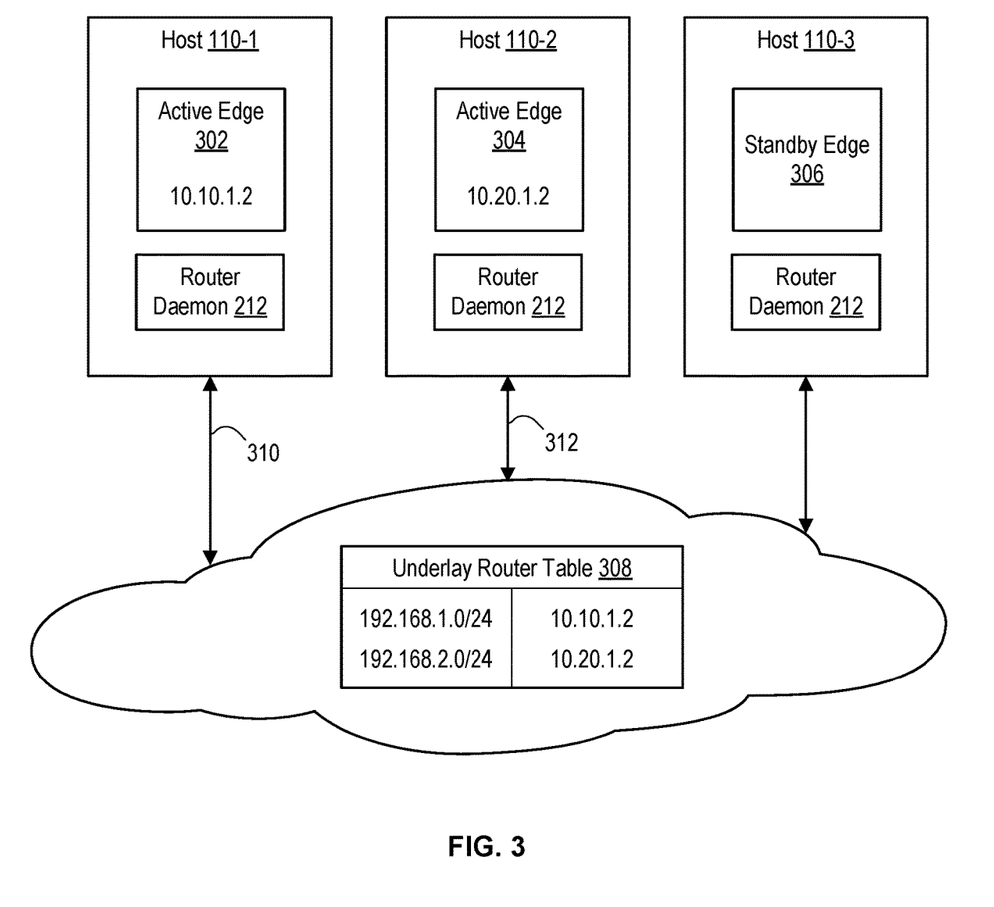
FIG. 3 is a block diagram depicting an ESG configuration in an SDDC according to embodiments.

FIG. 3 is a block diagram depicting an edge service (ES) configuration in SDRC 104 according to embodiments. In the embodiment, a host 110-1 executes an active edge 302 and an instance of router daemon 212. A host 110-2 executes an active edge 304 and an instance of router daemon 212. A host 110-3 executes a standby edge 306 and an instance of router daemon 212. Standby edge 306 can be paired with one of active edge 302 or active edge 304. The other standby edge is omitted for clarity.

In the embodiment, active edge 302 has an IP address 10.10.1.2 and active edge 304 has an IP address 10.20.1.2. Router daemon 212 is configured to program cloud control plane 106 to setup underlay router table 308 in underly router 114 based on the assigned CIDR blocks. In the embodiment, active edge 302 is assigned CIDR block 192.168.1.0/24 and active edge 304 is assigned CIDR block 192.168.2.0/24. Underlay router table 308 is configured with routes between CIDR block 192.168.1.0/24 and IF address 10.10.1.2 of active edge 302. Underlay router table 308 is configured with routes between CIDR block 192.168.2.0/24 and IP address 10.20.1.2 of active edge 304.

In an embodiment, traffic on network interface 310 of host 110-1 can have a rate that exceeds the capacity of the interface, or some threshold thereof (e.g., 80% of the capacity) for some period of time, suggesting a risk for congestion at active edge 302. In this case, active edge 302 is considered to be oversubscribed. If traffic on network interface 312 has a rate sufficiently below the capacity of the interface (e.g., below the threshold for some period of time), then active edge 304 is considered to be under-utilized.

Figure 4:
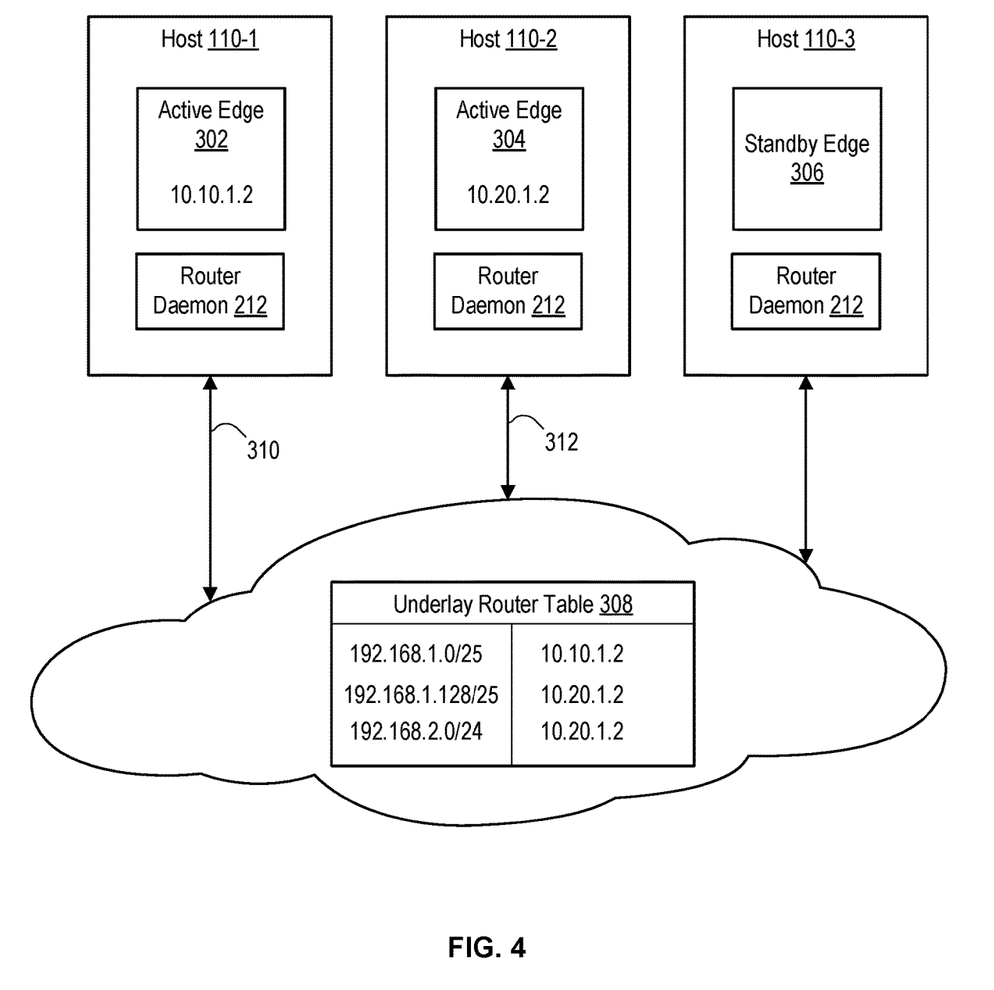
FIG. 4 is a block diagram depicting a rebalanced ESG configuration in an SDDC according to embodiments.
Figure 5:
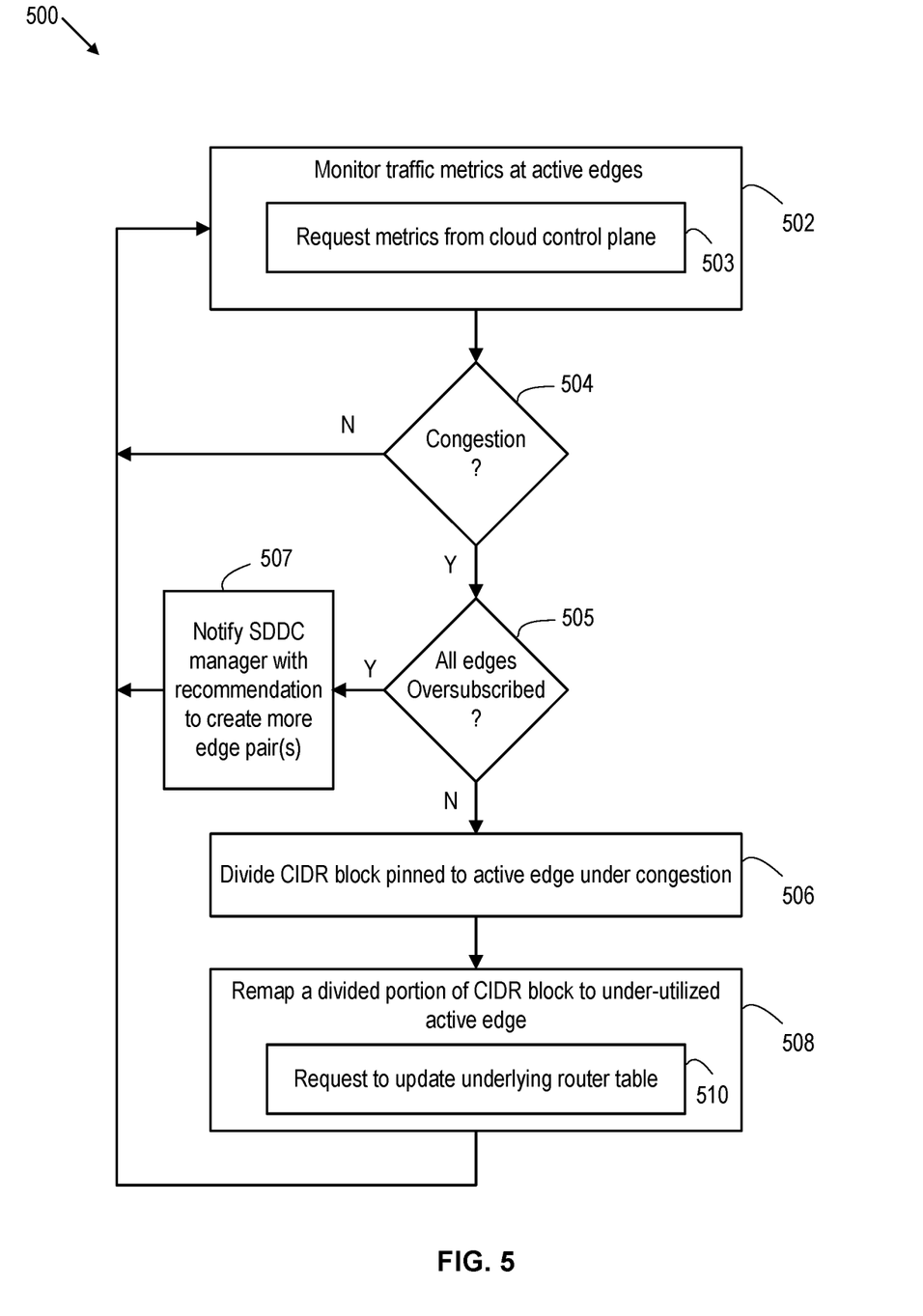
FIG. 5 is a flow diagram depicting a method of balancing traffic across ESGs according to embodiments.

FIG. 5 is a flow diagram depicting a method 500 of balancing traffic across ESGs according to embodiments. FIG. 4 is a block diagram depicting a rebalanced ESG configuration in SDDC 104 according to embodiments. Method 500 begins at step 502, where router daemon 212 monitors traffic metrics at the active edges. In embodiments, router daemon(s) in hosts 110 having standby edges is/are configured to perform the monitoring at step 502. In embodiments, a plurality of standby edges perform the monitoring step for redundancy in case one or more of the standby edges are not responding or otherwise nonfunctional. The router daemon(s) function as a localized control plane. If a centralized control plane is used, such as a network manager, this would increase the number of steps as the centralized control plane must relay the information back to the router daemons on the hosts to make decisions on the underlay network for modifying the tables. Each standby edge knows about its own active edge. The router daemon on the other hand gets this information from the routing table as each unique hop for workload CIDRs indicates a different active edge. For the multiple router daemons executing in parallel across standby edges, before updating the underly table, each router daemon will check whether the latest underlay table version already has the CIDR split triggered by another standby host. If the table is already updated, the router daemon performs no operation and continues to monitor the metrics as discussed below.

At step 503, router daemon 212 requests the traffic metrics from cloud control plane 106. The traffic metrics can include, for example, network packets in/network packets out information for hosts 110 having active edges executing therein. In embodiments, the metrics are collected every threshold time period (e.g., certain numbers of minutes). To account for transient conditions, the network should continuously list oversubscription for a threshold number of iterations. For example, X minutes for Y iterations for X*Y continuous oversubscription. Both X and Y are configurable to account for false positives and to fine-tune the network.

At step 504, router daemon 212 at host 110-3 having standby edge 306 executed thereon determines if there is traffic congestion at any active edge based on the traffic metrics. If not, method 500 continues monitoring at step 502. If there is traffic congestion at an active edge, method 500 proceeds instead to step 505. At step 505, router daemon 212 determines if all active edges are oversubscribed. That is, router daemon determines if there is traffic congestion at all active edges. If so, method 500 proceeds to step 507, where router daemon 212 notifies SDDC manager 119 with a recommendation to create more edge pair(s) 121 (e.g., horizontally scale out the ESGs). Method 500 then returns to step 502, where router daemon 212 continues monitoring. If there is at least one under-utilizes active edge at step 505, method 500 proceeds instead to step 506.

At step 506, router daemon 212 divides the CIDR block pinned to each active edge under congestion. If multiple CIDR blocks are assigned to a congested active edge, then the algorithm may select the CIDR block associated with the largest amount of traffic. In another embodiment, the algorithm may select the largest CIDR block, i.e., the CDR block having the most number of IP addresses, in the case of a tie, a CIDR block among the tied blocks may be selected at random. In embodiments, router daemon 212 divides the CIDR block into two CIDR blocks of two equal sizes (e.g., halves the CIDR block). At step 508, router daemon 212 remaps a divided portion of a CIDR block to an under-utilized active edge. If multiple under-utilized edges are available, then the divided portion of the CIDR block may be mapped to one of the under-utilized active edges with the least amount of traffic. At step 510, router daemon 212 requests cloud control plane 106 to update the routing table of underlying router 114.

As shown in FIG. 4, router daemon 212 detects that active edge 302 is oversubscribed as described in FIG. 3. In response, router daemon 212 divides the CIDR block 192.168.1.0/25 into two equal portions, e.g., 192.168.1.0/25 and 192.168.1.128/25. Router daemon 212 then requests an update to underlay router table 308 to update the routes. That is, a route is created between CIDR block 192.168.1.0/25 and 10.10.1.2, the IP address of active edge 302. Another route is created between CIDR block 192.168.1.128/25 and 10.20.1.2, the IP address of active edge 304. In the embodiment, active edge 304 is under-utilized and thus router daemon 212 remaps a portion of the CIDR block for active edge 302, which is oversubscribed, to active edge 304.

As shown in FIG. 5, if an active edge continues to be oversubscribed, router daemon 212 will continue to divide its CIDR block in an attempt to mitigate the traffic congestion. In embodiments, router daemon keeps dividing the CDR block of an oversubscribed active edge by two until the traffic congestion condition is mitigated. In embodiments, router daemon 212 tags the entries it requests in underlay router table 308 so it can aggregate underutilized routes, as described below.

Figure 6:
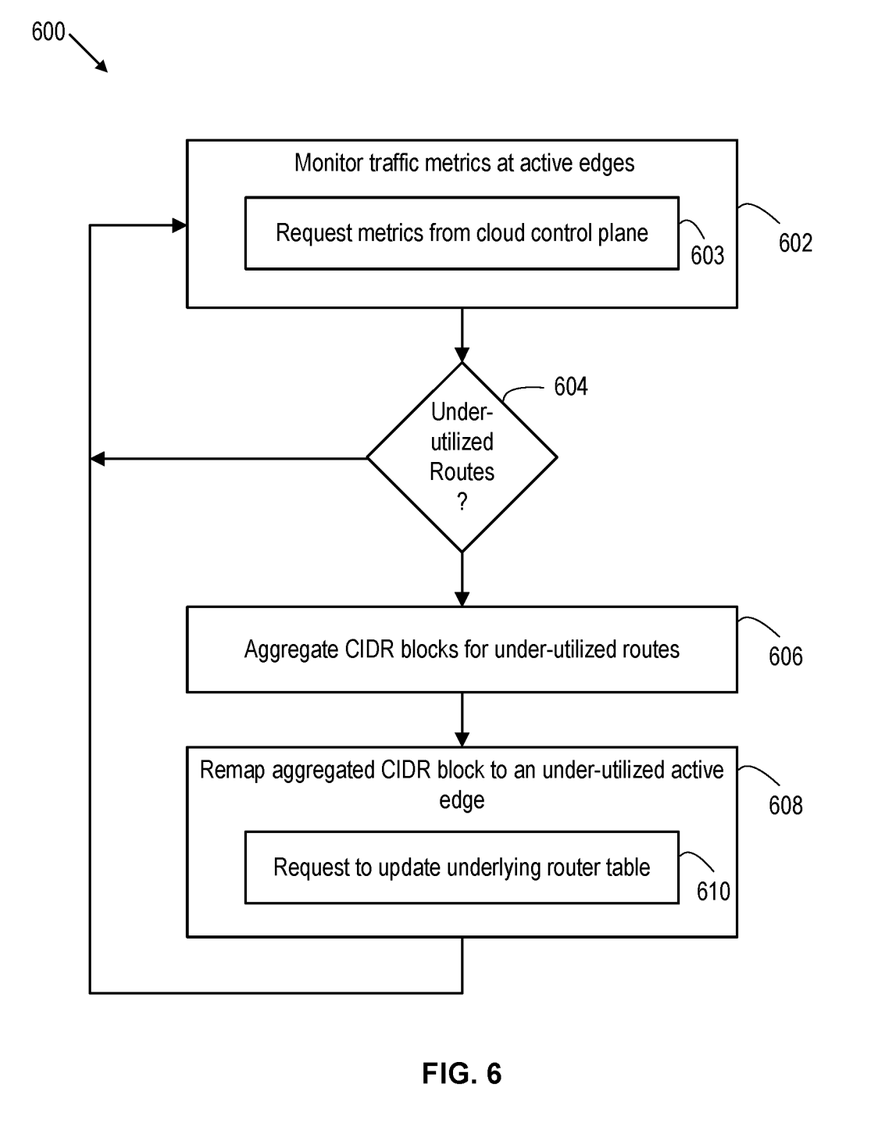
FIG. 6 is a flow diagram depicting a method of aggregating CIDR blocks for under-utilized routes according to embodiments.

FIG. 6 is a flow diagram depicting a method 600 of aggregating CIDR blocks for under-utilized routes according to embodiments. In some cases, traffic causing congestion at an active edge can be concentrated in a small portion of the CIDR block. This can cause router daemon 212 to divide the original CIDR block into many portions. The cloud provider may limit the number of routes that can be added to underlying router table 308. Having routes for under-utilized CIDR, blocks can be inefficient. Method 600 begins at step 602, where router daemon 212 monitors traffic metrics at the active edges. In embodiments, router daemon (s) in hosts 110 having standby edges is/are configured to perform the monitoring at step 602, At step 603, router daemon 212 requests the traffic metrics from cloud control plane 106. The traffic metrics can include, for example, network packets in/network packets out information for hosts 110 having active edges executing therein.

At step 604, router daemon 212 determines if there are any under-utilized routes. If not, method 600 returns to step 602 and continues monitoring. Otherwise, method 600 proceeds to step 606. At step 606, router daemon 212 aggregates CDR blocks for the under-utilized routes. Thus, if a CIDR block had been divided many times by method 500, method 600 can aggregate the under-utilized portions into a single portion of the original CIDR block. This can result, for example, with 10% of the original CIDR block remaining with the original active edge and 90% of the original CIDR block being redirected to an under-utilized active edge (e.g., two unequal portions of the original CIDR block). At step 608, router daemon 212 remaps the aggregated CIDR block to an under-utilized active edge. For example, at step 610, router daemon 212 can request the remap through cloud control plane 106.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of mitigating oversubscription of traffic to edge services gateways (ESGs) in a data center, a router in the data center including a first route between an internet protocol (IP) address of a first active edge of the ESGs and a first classless inter domain routing (CIDR) block assigned to the first active edge and a second route between an IP address of a second active edge of the ESGs and a second CIDR block assigned to the second active edge, the method comprising:
   receiving, by a host of the data center, traffic metrics corresponding to the ESGs;
   determining traffic congestion at the first active edge of the ESGs in response to the traffic metrics;
   dividing, in response to the traffic congestion, the first CIDR block into a first CIDR sub-block and a second CIDR sub-block;
   modifying, in a routing table of the router, the first route to be between the IP address of the first active edge and the first CIDR sub-block;
   creating, in the routing table of the router, a third route between an IP address of the second active edge of the ESGs and the second CIDR sub-block; and
   creating, in the routing table of the router, a fourth route between the IP address of the second active edge and a third CIDR block, the third CIDR block being an aggregation of CIDR blocks of a plurality of under-utilized routes.

2. The method of claim 1, wherein the host executes a standby edge of the ESGs.

3. The method of claim 1, wherein the host is configured to determine the traffic congestion by requesting the traffic metrics from a control plane of a cloud in which the data center is provisioned.

4. The method of claim 3, wherein the router comprises an underlay router in a physical network of the cloud.

5. The method of claim 1, further comprising:
   determining the second active edge of the ESGs to be under-utilized based on the traffic metrics.

6. The method of claim 1, further comprising:
   determining the plurality of under-utilized routes in the routing table of the router;
   aggregating the CIDR blocks of the plurality of under-utilized routes into the third CIDR block; and
   removing the plurality of under-utilized routes from the routing table.

7. The method of claim 6, wherein the host is configured to determine the plurality of under-utilized routes in the routing table in response to the traffic metrics and tags on the plurality of under-utilized routes.

8. A non-transitory computer readable medium comprising instructions to be executed in a computing device to cause the computing device to carry out a method of mitigating oversubscription of traffic to edge services gateways (ESGs) in a data center, a router in the data center including a first route between an internet protocol (IP) address of the first active edge of the ESGs and a first classless inter domain routing (CIDR) block assigned to the first active edge and a second route between an IP address of the second active edge of the ESGs and a second CIDR block assigned to the second active edge, the method comprising:

receiving, by a host of the data center, traffic metrics corresponding to the ESGs;

determining traffic congestion at the first active edge of the ESGs in response to the traffic metrics;

dividing, in response to the traffic congestion, the first CIDR block into a first CIDR sub-block and a second CIDR sub-block;

modifying, in a routing table of the router, the first route to be between the IP address of the first active edge and the first CIDR sub-block;

creating, in the routing table of the router, a third route between an IP address of the second active edge of the ESGs and the second CIDR sub-block; and  creating, in the routing table of the router, a fourth route between the IP address of the second active edge and a third CIDR block, the third CIDR block being an aggregation of CIDR blocks of a plurality of under-utilized routes.

9. The non-transitory computer readable medium of claim 8, wherein the host executes a standby edge of the ESGs.

10. The non-transitory computer readable medium of claim 8, wherein the host is configured to determine the traffic congestion by requesting the traffic metrics from a control plane of a cloud in which the data center is provisioned.

11. The non-transitory computer readable medium of claim 10, wherein the router comprises an underlay router in a physical network of the cloud.

12. The non-transitory computer readable medium of claim 8, further comprising:

determining the second active edge of the ESGs to be under-utilized based on the traffic metrics.

13. The non-transitory computer readable medium of claim 8, further comprising:

determining the plurality of under-utilized routes in the routing table of the router;

aggregating the CIDR blocks of the plurality of under-utilized routes into the third CIDR block; and  removing the plurality of under-utilized routes from the routing table.

14. The non-transitory computer readable medium of claim 13, wherein the host is configured to determine the plurality of under-utilized routes in the routing table in response to the traffic metrics and tags on the plurality of under-utilized routes.

15. A computing system, comprising:

edge services gateways (ESGs) of a data center including a first active edge and a second active edge;

a router including a first route between an internet protocol (IP) address of the first active edge and a first classless inter domain routing (CIDR) block assigned to the first active edge, and a second route between an IP address of the second active edge and a second CIDR block assigned to the second active edge;

a host in the data center having a hardware platform; and the host configured to:

receive traffic metrics corresponding to the ESGs;

determine traffic congestion at the first active edge of the ESGs in response to the traffic metrics;

divide, in response to the traffic congestion, the first CIDR block into a first CIDR sub-block and a second CIDR sub-block;

modify, in a routing table of the router, the first route to be between the IP address of the first active edge and the first CIDR sub-block;

create, in the routing table of the router, a second route between the IP address of a second active edge of the ESGs and the second CIDR sub-block;

create, in the routing table of the router, a fourth route between the IP address of the second active edge and a third CIDR block, the third CIDR block being an aggregation of CIDR blocks of a plurality of under-utilized routes.

16. The computing system of claim 15, wherein the host executes a standby edge of the ESGs.

17. The computing system of claim 15, wherein the host is configured to determine the traffic congestion by requesting the traffic metrics from a control plane of a cloud in which the data center is provisioned.

18. The computing system of claim 17, wherein the router comprises an underlay router in a physical network of the cloud.

19. The computing system of claim 15, wherein the host is configured to:

determine the second active edge of the ESGs to be under-utilized based on the traffic metrics.

20. The computing system of claim 15, wherein the host is configured to:

determine the plurality of under-utilized routes in the routing table of the router;

aggregate the CIDR blocks of the plurality of under-utilized routes into the third CIDR block; and  remove the plurality of under-utilized routes from the routing table.

\* \* \* \* \*